US012581319B1

(12) United States Patent
Somal et al.

(10) Patent No.: US 12,581,319 B1
(45) Date of Patent: Mar. 17, 2026

(54) INSTALLING WIRELESS RANGE EXTENDER WITHIN A CUSTOMER PREMISES OF A SERVICE PROVIDER NETWORK

(71) Applicant: CSC Holdings, LLC, Bethpage, NY (US)

(72) Inventors: Shashank Somal, Levittown, NY (US); Rajesh Khandelwal, Princeton Junc., NJ (US)

(73) Assignee: CSC Holdings, LLC., Bethpage, NY (US)

( * ) Notice: Subject to any disclaimer, the term of this patent is extended or adjusted under 35 U.S.C. 154(b) by 292 days.

(21) Appl. No.: 18/303,946

(22) Filed: Apr. 20, 2023

(51) Int. Cl.
| | |
|---|---|
| *H04W 16/20* | (2009.01) |
| *H04L 41/0816* | (2022.01) |
| *H04W 72/542* | (2023.01) |
| *H04W 16/18* | (2009.01) |
| *H04W 88/08* | (2009.01) |

(52) U.S. Cl.
CPC ......... *H04W 16/20* (2013.01); *H04L 41/0816* (2013.01); *H04W 72/542* (2023.01); *H04W 88/08* (2013.01)

(58) Field of Classification Search
CPC ..... H04W 16/00; H04W 16/18; H04W 16/20; H04W 16/225
See application file for complete search history.

(56) References Cited

U.S. PATENT DOCUMENTS

| | | | | |
|---|---|---|---|---|
| 7,933,605 B2 * | 4/2011 | Rappaport | ............ | H04W 16/20 |
| | | | | 455/566 |
| 2019/0387415 A1 * | 12/2019 | Scahill | ................. | H04W 16/26 |
| 2023/0032606 A1 * | 2/2023 | Schanhals | ............ | H04W 4/021 |

* cited by examiner

*Primary Examiner* — Kamran Afshar
(74) *Attorney, Agent, or Firm* — Lowenstein Sandler LLP

(57) ABSTRACT
Systems, methods, and apparatuses disclosed herein can be utilized to install wireless networking equipment, such as a wireless access point and/or a wireless range extender, with a customer premises. These systems, methods, and apparatuses estimate a communication range, or a reach, of the wireless access point within the customer premises. These systems, methods, and apparatuses can thereafter identify one or more locations within the customer premises that are situated at or near a maximum communication range, or a maximum reach, of the wireless access point provides reliable packet delivery from in which to place the wireless range extender. The maximum communication range, or the maximum reach, of the wireless access point can be associated with a minimum signal metric for applications, such as Voice over Internet Protocol (VoIP), Voice over Wi-Fi (VoWiFi), and/or streaming video to provide some examples, that provides very reliable, timely packet delivery, and/or a minimum signal metric that provides reliable packet delivery for applications, such as electronic mail (email) and/or web surfing to provide some examples. These systems, methods, and apparatuses can identify the one or more locations within the customer premises that are associated with signal metrics between the minimum signal metric that provides the very reliable, timely packet delivery, and the minimum signal metric that provides the reliable packet delivery in which to place the wireless range extender.

17 Claims, 10 Drawing Sheets

302

306

200

UNUSABLE

POOR

Figure 1:
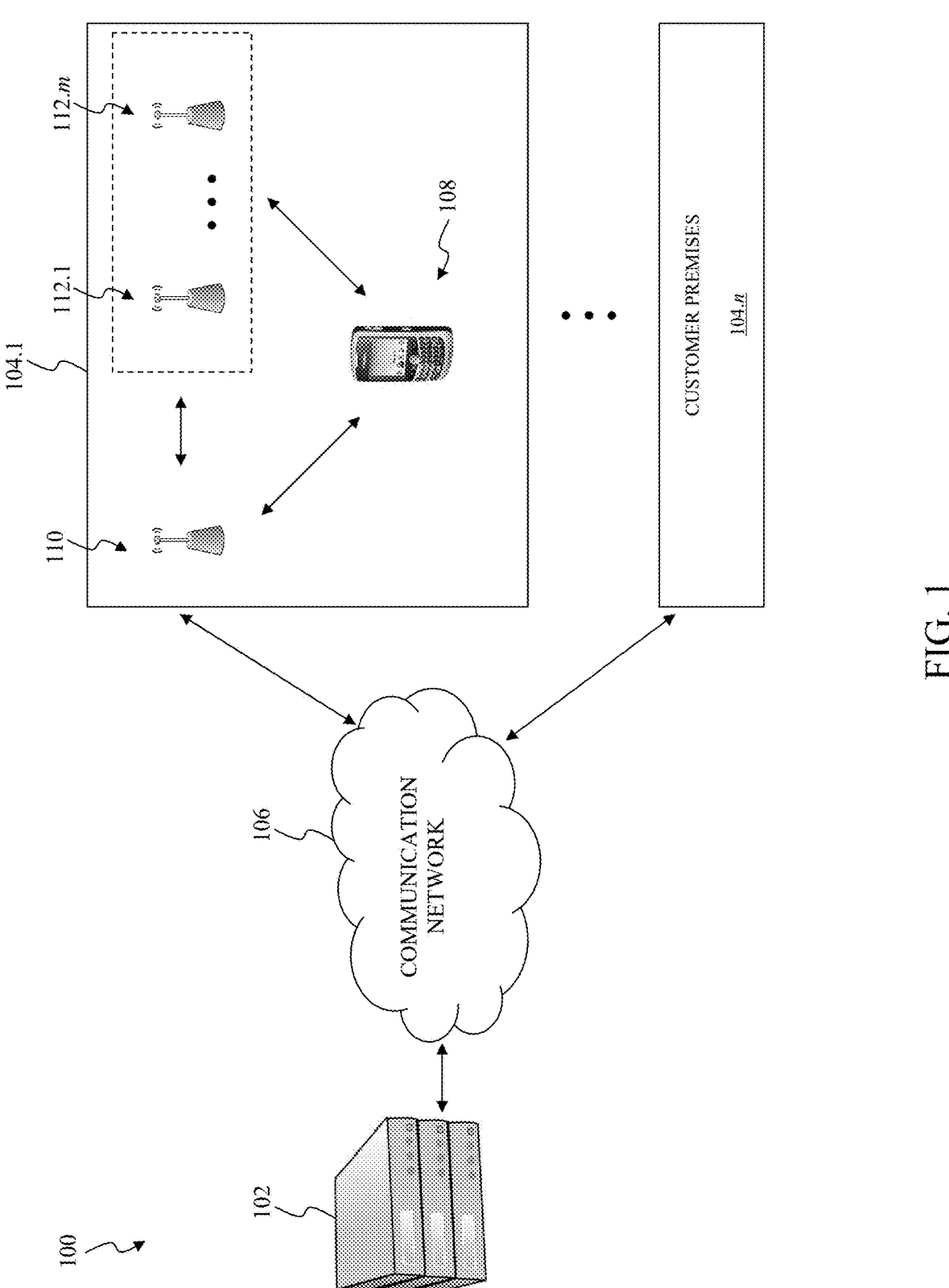

KITCHEN
206.2

BATHROOM
206.7

GARAGE
206.8

AVERAGE

FAMILY
ROOM
206.1

DINING
ROOM
206.6

GOOD

BEDROOM
206.4

BEDROOM
206.5

EXCELLENT

INSTALLING WIRELESS RANGE EXTENDER WITHIN A CUSTOMER PREMISES OF A SERVICE PROVIDER NETWORK

BACKGROUND

A service provider network provides a service, such as communication of video, audio, and/or data to provide some examples, to a customer premise that is associated with a customer of the service. Often times, a service provider operating the service provider network provides the customer with wireless network equipment, for example, a wireless access point and/or one or more wireless range extenders, to facilitate the service. Conventionally, the customer schedules a service appointment with the service provider to have the service provider dispatch a service personnel to the customer premise to install the wireless network equipment. Not only does this delay the service from being provided to the customer, it prevents the service personnel from diagnosing and/or to remedying errors, faults, and/or failures within the service provider network that may be affecting the service.

BRIEF DESCRIPTION OF THE DRAWINGS/FIGURES

Figure 2:
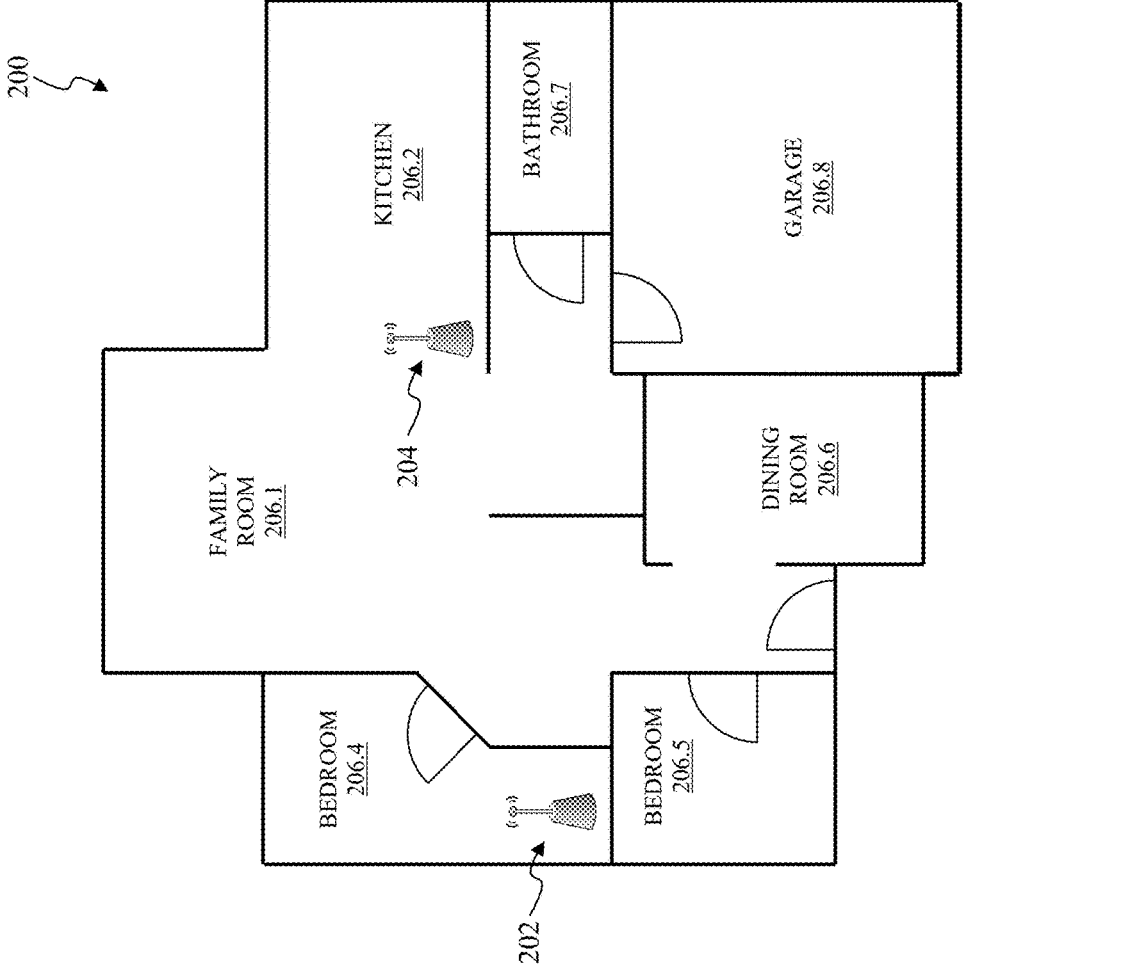
Figure 4:
Figure 4:
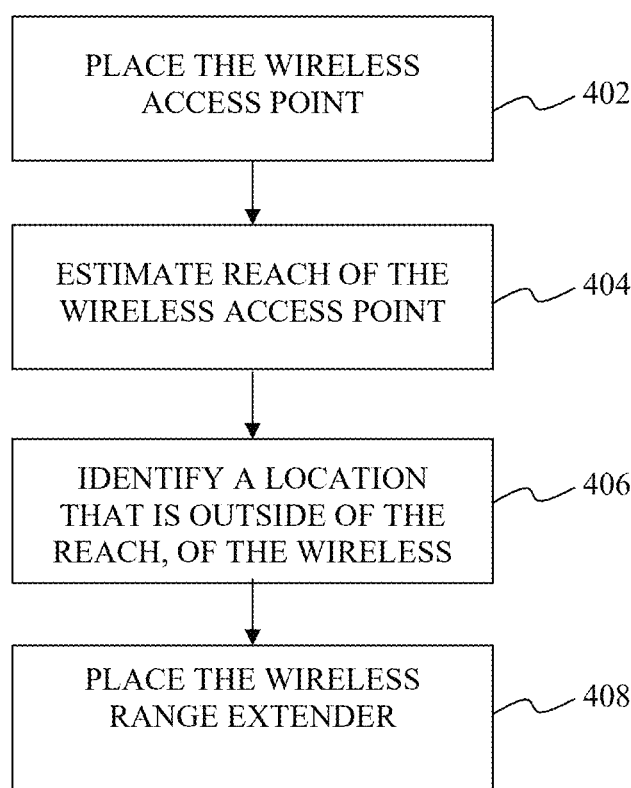
Figure 5:
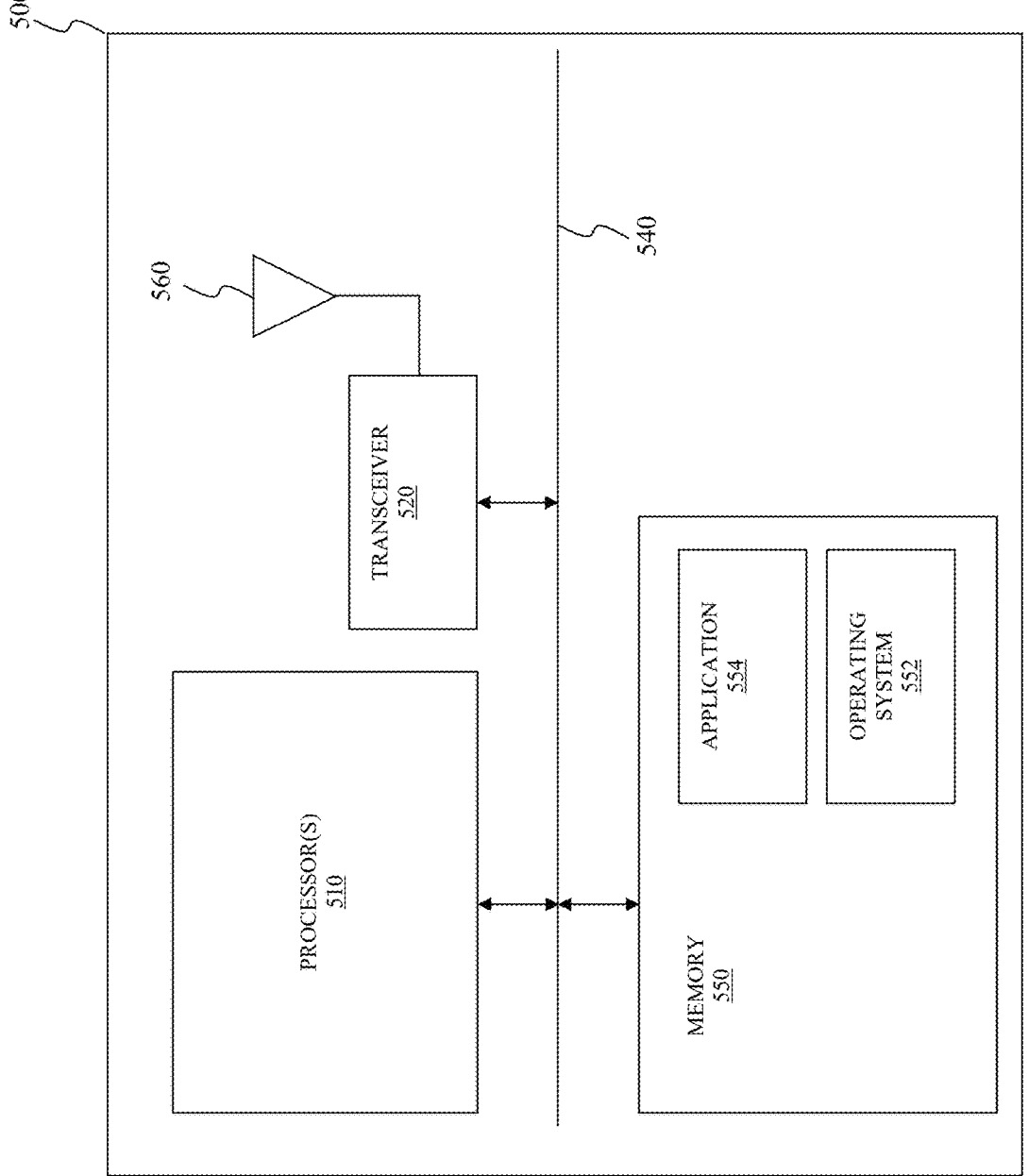

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings:

FIG. 1 graphically illustrates an exemplary service provider network according to an exemplary embodiment of the present disclosure;

FIG. 2 graphically illustrates an exemplary customer premises that can be constructed within the service provider network according to an exemplary embodiment of the present disclosure;

FIG. 3A through FIG. 3F graphically illustrate exemplary installation of exemplary wireless network equipment within the exemplary customer premises;

FIG. 4 illustrates a flowchart of an exemplary operation for installing the exemplary wireless network equipment within the exemplary customer premises according to an exemplary embodiment of the present disclosure; and FIG. 5 illustrates a block diagram of an exemplary wireless capable device that can be implemented within the exemplary service provider network in accordance with various embodiments of the present disclosure.

The present disclosure will now be described with reference to the accompanying drawings.

DETAILED DESCRIPTION OF THE DISCLOSURE

The following disclosure provides many different embodiments, or examples, for implementing different features of the provided subject matter. Specific examples of components and arrangements are described below to simplify the present disclosure. These are, of course, merely examples and are not intended to be limiting. Aspects of the present disclosure are best understood from the following detailed description when read with the accompanying figures. The present disclosure may repeat reference numerals and/or letters in the various examples. This repetition does not in itself dictate a relationship between the various embodiments and/or configurations discussed. It is noted that, in accordance with the standard practice in the industry, features are not drawn to scale. In fact, the dimensions of the features may be arbitrarily increased or reduced for clarity of discussion.

Overview

Systems, methods, and apparatuses disclosed herein can be utilized to install wireless networking equipment, such as a wireless access point and/or a wireless range extender, within a customer premises. These systems, methods, and apparatuses estimate a communication range, or a reach, of the wireless access point within the customer premises. These systems, methods, and apparatuses can thereafter identify one or more locations within the customer premises that are situated at or near a maximum communication range, or a maximum reach, of the wireless access point that provides reliable packet delivery in which to place the wireless range extender. In some embodiments, the maximum communication range, or the maximum reach, of the wireless access point can be associated with a minimum signal metric for applications, such as Voice over Internet Protocol (VoIP), Voice over Wi-Fi (VoWiFi), and/or streaming video to provide some examples, that provides very reliable, timely packet delivery, and/or a minimum signal metric that provides reliable packet delivery for applications, such as electronic mail (email) and/or web surfing to provide some examples. In these embodiments, these systems, methods, and apparatuses can identify the one or more locations within the customer premises that are associated with signal metrics between the minimum signal metric that provides the very reliable, timely packet delivery, and the minimum signal metric that provides the reliable packet delivery in which to place the wireless range extender.

Exemplary Service Provider Network

FIG. 1 graphically illustrates an exemplary service provider network according to an exemplary embodiment of the present disclosure. In the exemplary embodiment illustrated in FIG. 1, a service provider network 100 provides electronic communication between a service provider system 102 and customer premises 104.1 through 104.n via a communication network 106. As to be described in further detail below, the customer premises 104.1 through 104.n can include wireless networking equipment to route electronic communications between the service provider system 102 and one or more electronic devices within the customer premises 104.1 through 104.n. Although the discussion to follow can describe the customer premises 104.1 through 104.n as performing certain actions, it should be appreciated that such descriptions are merely for convenience and that such actions in fact result from the operation of one or more mechanical, electrical, and/or electro-mechanical devices included within the customer premises 104.1 through 104.n as will be recognized by those skilled in the relevant art(s) without departing from the spirit and scope of the present disclosure. Conventionally, the service provider network 100 dispatches service personnel to the customer premises 104.1 through 104.n to install the wireless networking equipment within the customer premises 104.1 through 104.n. However, as to be described in further detail below, customers associated with the customer premises 104.1 through 104.n, as opposed to the service personnel, can install the wireless networking equipment within the customer premises 104.1 through 104.n as to be described in further detail below. As a result, the service personnel can be made available for diagnosing and/or to remedying errors, faults, and/or failures within the service provider network 100.

The service provider system 102 represents one or more computer systems, an exemplary embodiment of which is to be described in further detail below, which facilitates electronic communications between the service provider system 102 and the customer premises 104.1 through 104.*n*. As used herein, the term "downstream direction" refers to a first route for electronic communications from the service provider system 102 to the customer premises 104.1 through 104.*n*. The term "upstream direction" refers to a second route for electronic communications from the customer premises 104.1 through 104.*n* to the service provider system 102. In some embodiments, the service provider system 102 can transmit electronic communications in the downstream direction to the customer premises 104.1 through 104.*n* to transmit, for example, video, audio, and/or data, from the service provider system 102 to the customer premises 104.1 through 104.*n*. Alternatively, or in addition to, the customer premises 104.1 through 104.*n* can transmit electronic communications in the upstream direction to the service provider system 102 to transmit, for example, video, audio, and/or data, from the customer premises 104.1 through 104.*n* to the service provider system 102. In some embodiments, these communications can be provided as part of a service between the service provider system 102 and the customer premises 104.1 through 104.*n*. In these embodiments, the service can include, for example, delivery of media content, such as movies, television programs, and/or electronic programing guides (EPGs), internet access, and/or telephone service. Often times, the service can be associated with a service agreement that outlines various parameters, characteristics, and/or attributes of the service to be provided by the service provider system 102. For example, the service agreement can outline quality of service (QoS), such as speeds of the downstream direction or speeds of the upstream direction, between the service provider system 102 and the customer premises 104.1 through 104.*n*.

The customer premises 104.1 through 104.*n* represent building and/or non-building structures that receive the service from the service provider network 100. Generally, the one or more building structures refer to any suitable structure or structures that are designed for human occupancy and can include one or more residential, industrial, and/or commercial building structures to provide some examples. And the one or more non-building structures refer to any suitable structure or structures that are not designed for human occupancy and can include one or more residential, industrial, and/or commercial non-building structures to provide some examples. In some embodiments, the customer premises 104.1 through 104.*n* represent building and/or non-building structures that have entered into the service agreement with a service provider operating the service provider network 100 to provide the service between the service provider system 102 and the customer premises 104.1 through 104.*n*. In some embodiments, the customer premises 104.1 through 104.*n* can include the wireless networking equipment to facilitate the service provided by the service provider network 100. In the exemplary embodiment illustrated in FIG. 1, the customer premises 104.1 through 104.*n* can be similarly configured and arranged with respect to each other. As such, only the customer premises 104.1 is to be described in further detail below.

As illustrated in FIG. 1, the customer premises 104.1 can include a wireless capable device 108 to facilitate the service to a customer that is associated with the customer premises

104.1. In some embodiments, the wireless capable device 108 can receive electronic communications in the downstream direction to provide, for example, video, audio, and/or data, from the service provider system 102. Alternatively, or in addition to, the wireless capable device 108 can transmit electronic communications in the upstream direction to transmit, for example, video, audio, and/or data, to the service provider system 102. The wireless capable device 108 can represent a mobile telephony device, such as a mobile phone, a mobile computing device, a mobile internet device, such as a tablet computer and/or a laptop computer, a video game console, a portable media player, a peripheral device, such as wireless speaker, a mouse, a keyboard, a monitor, a printer, and/or a scanner, an internet capable appliance, a smart television, and/or any other suitable communication device that is capable of wireless communication that will be recognized by those skilled in the relevant art(s) without departing from the spirit and scope of the present disclosure. In some embodiments, the wireless capable device 108 can be implemented as a standalone, or a discrete device, and/or can be incorporated within or coupled to another electrical device, or host device, such as a wireless communication device, a smart phone, a laptop computing device, a desktop computing device, a tablet computing device, a personal assistant device, a monitor, a television, a wearable device, and/or any other suitable electronic device that will be apparent to those skilled in the relevant art(s) without departing from the spirit and scope of the disclosure.

As illustrated in FIG. 1, the customer premises 104.1 can include the wireless networking equipment to facilitate the service between the service provider system 102 and the wireless capable device 108 to the customer. In the exemplary embodiment illustrated in FIG. 1, the wireless networking equipment can include a wireless access point 110 to route electronic communications between the service provider system 102 and the wireless capable device 108. In some embodiments, the wireless access point 110 can transmit electronic communications in the downstream direction to the wireless capable device 108 to transmit, for example, video, audio, and/or data, from the service provider system 102 to the wireless capable device 108. Alternatively, or in addition to, the wireless capable device 108 can transmit electronic communications in the upstream direction to the wireless access point 110 to transmit, for example, video, audio, and/or data, from the wireless capable device 108 to the service provider system 102. In some embodiments, the wireless access point 110 can provide electronic communications as part of the service as described above. Generally, the wireless access point 110 includes any suitable electrical, mechanical, and/or electromechanical devices that is capable communicatively coupling the service provider system 102 and the wireless capable device 108 to one another as will be recognized by those skilled in the relevant art(s) without departing from the spirit and scope of the present disclosure. In some embodiments, the wireless capable device 108 and the wireless access point 110 can be wirelessly coupled to each other as outlined in one or more wireless standards, for example, one or more versions of Institute of Electrical and Electronics Engineers (IEEE) 802.11 standards for local area networks (LAN), personal area network (PAN), and/or metropolitan area networks (MAN). In some embodiments, the wireless access point 110 may be implemented as a standalone or a discrete device within the customer premises 104.1 or may be incorporated within or coupled to other devices or hosts, such as a wireless set-top box (STB) to provide an example, within the customer premises 104.1.

In the exemplary embodiment illustrated in FIG. 1, the wireless networking equipment can further include one or more wireless range extenders, also referred to wireless repeaters and/or Wi-Fi extenders, 112.1 through 112.m to assist the wireless access point 110 in facilitating the service. As described above, the wireless capable device 108 and the wireless access point 110 can be wirelessly coupled to each other. Often times, a communication range, or reach, of the wireless access point 110 can be dependent upon placement within the customer premises 104.1, for example, height above ground, nearby obstructions, nearby electronic devices that might actively interfere, type of antenna, and/or the weather. In some embodiments, the wireless capable device 108 can be outside of the communication range, or reach, of the wireless access point 110 to communicate with the wireless access point 110. As such, the customer premises 104.1 can optionally include the one or more wireless range extenders 112.1 through 112.m to effectively extend the communication range, or the reach, of the wireless access point 110 as illustrated in FIG. 1. In the exemplary embodiment illustrated in FIG. 1, the one or more wireless range extenders 112.1 through 112.m can route electronic communications between the wireless capable device 108 and the wireless access point 110. In some embodiments, the one or more wireless range extenders 112.1 through 112.m can transmit electronic communications in the downstream direction from the wireless access point 110 to the wireless capable device 108 to receive, for example, video, audio, and/or data, from the service provider system 102. Alternatively, or in addition to, the one or more wireless range extenders 112.1 through 112.m can transmit electronic communications in the upstream direction from the wireless capable device 108 to the wireless access point 110 to transmit, for example, video, audio, and/or data, to the service provider system 102.

In the exemplary embodiment illustrated in FIG. 1, the wireless access point 110 and/or the one or more wireless range extenders 112.1 through 112.m can be situated within various locations within the customer premises 104.1 to functionally cooperate to provide continuous, or near-continuous, wireless electronic communications within the customer premises 104.1. In some embodiments, a customer associated with the customer premises 104.1 operating the wireless capable device 108 can install the wireless access point 110 and/or the one or more wireless range extenders 112.1 through 112.m within the customer premises 104.1 as to be described in further detail below. As part of this installation, the customer can place the wireless access point 110 within the customer premises 104.1. In some embodiments, the customer can place the wireless access point 110 at any suitable location within the customer premises 104.1 that will be apparent to those skilled in the relevant art(s) without departing from the spirit and scope of the present disclosure. The suitable location can include a central location within the customer premises 104.1 that is situated away from any corners, walls, or other physical obstructions to provide maximum signal coverage and/or a high location within the customer premises 104.1 to provide the best signal metric and/or performance to provide some examples. After placing the wireless access point 110 within the customer premises 104.1, the customer can activate the wireless access point 110.

After activating the wireless access point 110, the customer can subsequently operate the wireless capable device

108 to estimate the communication range, or the reach, of the wireless access point 110 within the customer premises 104.1. Thereafter, the customer can operate the wireless capable device 108 to identify one or more locations within the customer premises 104.1 that are situated at or near a maximum communication range, or a maximum reach, of the wireless access point 110 that provides reliable packet delivery in which to place the one or more wireless range extenders 112.1 through 112.m. The customer can subsequently operate the wireless capable device 108 to identify one or more locations within these locations to place, or position, the one or more wireless range extenders 112.1 through 112.m within the customer premises 104.1 as part of this installation. The customer can afterwards place the one or more wireless range extenders 112.1 through 112.m at the one or more locations that were identified by the wireless capable device 108 to situate the one or more wireless range extenders 112.1 through 112.m within the customer premises 104.1 to provide the continuous, or the near-continuous, wireless electronic communications within the customer premises 104.1.

After placing the one or more wireless range extenders 112.1 through 112.m at the one or more locations, the customer can subsequently activate the one or more wireless range extenders 112.1 through 112.m. In some embodiments, the customer can operate the wireless capable device 108 to interact with the one or more wireless range extenders 112.1 through 112.m to configure these wireless range extenders for wireless communication. In these embodiments, the wireless capable device 108 can configure one or more parameters, characteristics, and/or attributes of the one or more wireless range extenders 112.1 through 112.m, such as customer credentials, for example, username and/or password, that are associated with the customer, frequency bands of operation for the one or more wireless range extenders 112.1 through 112.m, and/or service set identifiers (SSIDs) and/or passwords for the one or more wireless range extenders 112.1 through 112.m to provide some examples. In some embodiments, the customer can subsequently operate the wireless capable device 108 to estimate the communication ranges, or the reaches, of the wireless range extenders 112.1 through 112.m to quantify wireless electronic communication coverage within the customer premises 104.1. In some embodiments, the wireless capable device 108 and/or the wireless access point 110 can provide the arrangement, for example, the locations, of the wireless access point 110 and/or the one or more wireless range extenders 112.1 through 112.m within the customer premises 104.1 to the service provider system 102. In these embodiments, the arrangement of the wireless access point 110 and/or the one or more wireless range extenders 112.1 within the customer premises 104.1 can be advantageous in diagnosing and/or remedying errors, faults, and/or failures within the service provider network 100 as described in, for example, U.S. patent application Ser. No. 17/138,679, filed on Dec. 30, 2020, which is incorporated herein by reference in its entirety.

The communication network 106 communicatively couples the service provider system 102 and the customer premises 104.1 through 104.n. The communication network 106 can implemented as a wireless communication network, a wireline communication network, and/or any combination thereof that will be apparent to those skilled in the relevant art(s) without departing from the spirit and scope of the present disclosure. In some embodiments, the communication network 106 can include one or more guided transmission mediums, such as one or more twisted pair cables, one or more Ethernet cables, one or more coaxial cables, and/or one or more optical fiber cables to provide some examples, to communicatively couple the service provider system 102 and the customer premises 104.1 through 104.*n*. In these embodiments, the communication network 106 can include a hybrid fiber-coaxial (HFC) network that combines the one or more optical fiber cables and the one or more coaxial cables to communicatively couple the service provider system 102 and the customer premises 104.1 through 104.*n*. In these embodiments, the communication network 106 can include a fiber to the home (FTTH) network that utilizes the one or more optical fiber cables for at least a portion of the communication network 106 to communicatively the service provider system 102 and the customer premises 104.1 through 104.*n*. In some embodiments, the communication network 106 can include one or more unguided transmission mediums, such as one or more radio links, one or more microwave links, one or more satellite links, one or more Bluetooth links, one or more WIFI links to provide some examples, to communicatively couple the service provider system 102 and the customer premises 104.1 through 104.*n*.

Exemplary Customer Premises

FIG. 2 graphically illustrates an exemplary customer premises that can be constructed within the service provider network according to an exemplary embodiment of the present disclosure. The discussion of FIG. 2 to follow is to describe a customer premises 200 that can be constructed with a service provider network, such as the service provider network 100 to provide an example. As illustrated in FIG. 2, the customer premises 200 can include one or more rooms, such as a family room 206.1, a kitchen 206.2, a bathroom 206.3, a first bedroom 206.4, a second bedroom 206.5, a dining room 206.6, and a garage 206.7. However, those skilled in the relevant art(s) will recognize that the configuration and arrangement of the customer premises 200 is for illustrative purposes only and not limiting. Rather, those skilled in the relevant art(s) will recognize that the teachings herein are equally applicable other customer premises having other configurations and arrangements without departing from the spirit and scope of the present disclosure. For example, these other customer premises can include different numbers of rooms, different types of rooms, and/or different numbers of floors than the customer premises 200 as illustrated in FIG. 2. In some embodiments, the customer premises 200 can represent an exemplary embodiment of one or more of the customer premises 104.1 through 104.*n* as described above in FIG. 1.

In the exemplary embodiment illustrated in FIG. 2, a customer associated with the customer premises 200 can enter into a service agreement with a service provider operating a service provider network, such as the service provider network 100 as described above in FIG. 1 to provide an example, to provide a service, for example, media content, internet access, and/or telephone service, to the customer premises 200. As illustrated in FIG. 2, the service provider can provide wireless networking equipment, such as a wireless access point 202 and a wireless range extender 204, to the customer for installation at the customer premises 200 to facilitate the service as to be described in further detail below. The wireless access point 202 and the wireless range extender 204 can represent exemplary embodiments of the wireless access point 110 and one or more of the one or more wireless range extenders 112.1 through 112.*m*, respectively, as described above in FIG. 1.

Exemplary Installation of Wireless Networking Equipment within the Exemplary Customer Premises FIG. 3A through FIG. 3F graphically illustrate exemplary installation of exemplary wireless network equipment within the exemplary customer premises. The discussion of FIG. 3A through FIG. 3F to follow is to graphically illustrate and describe an exemplary installation process that can be performed by a wireless capable device to install the wireless access point 202 and the wireless range extender 204 within the customer premises 200. The disclosure is not limited to this exemplary installation process. Rather, it will be apparent to ordinary persons skilled in the relevant art(s) that other exemplary installation processes are within the scope and spirit of the present disclosure. For example, these other exemplary installation processes can perform the operations to be described in further detail below in a different order than as described in further detail below install the wireless access point 202 and the wireless range extender 204 within the customer premises 200. As another example, these other exemplary installation processes need not perform each of the perform the operations to be described in further detail below to install the wireless access point 202 and the wireless range extender 204 within the customer premises 200. And those skilled in the relevant art(s) will recognize that the exemplary installation process to be described in further detail below can be similarly performed within other customer premises to install the wireless access point 202 and the wireless range extender 204 within these other customer premises without departing from the spirit and scope of the present disclosure. Although the exemplary installation process can be described below in terms of two-dimensions, for example, x-coordinates and y-coordinates of a Cartesian coordinate system, this is for illustrative purposes only and not limiting. Those skilled in the relevant art(s) will recognize that the exemplary installation process can be similarly implemented in three-dimensions, for example, x-coordinates, y-coordinates, and z-coordinates of a Cartesian coordinate system, without departing from the spirit and scope of the present disclosure.

Figure 3A:
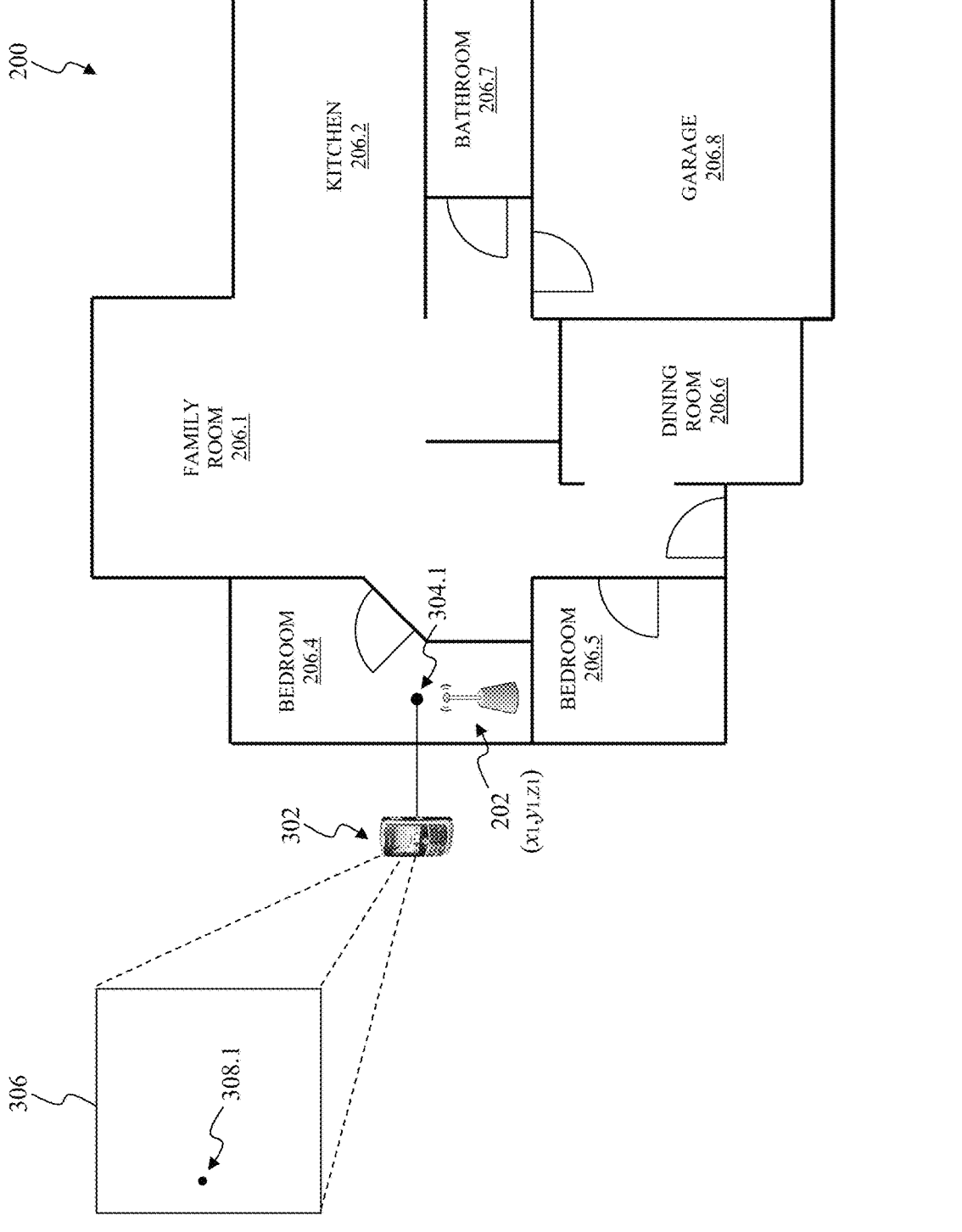

As illustrated in FIG. 3A, the customer can place the wireless access point 202 at a three-dimensional location $(x_1, y_1, z_1)$ within the customer premises 200, for example, within the first bedroom 206.4. However, those skilled in the relevant art(s) will recognize that the placement of the wireless access point 202 within the first bedroom 206.4 is for illustrative purposes only and not limiting. Rather, those skilled in the relevant art(s) will recognize that of the wireless access point 202 can be placed elsewhere within the customer premises 200 without departing from the spirit and scope of the present disclosure. It can be advantageous, but not necessary, for the customer to place the wireless access point 202 away from any corners, walls, or other physical obstructions within the customer premises 200 and/or at a high location within the customer premises 200, for example, onto a furniture piece within the customer premises 200 or a wall mounted shelf within the customer premises 200 to provide some examples.

After placing the wireless access point 202 within the customer premises 200, the customer can execute a wireless network installation tool executing on a wireless capable device 302 to assist the customer to install the wireless access point 202 and the wireless range extender 204 within the customer premises 200. The wireless capable device 302 can represent an exemplary embodiment of the wireless capable device 108 as described above in FIG. 1. Generally, the wireless network installation tool, which is to be described in further detail below, can represent one or more software application programs, also referred to as software applications, applications, apps, or the like, that can be executed by one or more electrical, mechanical, and/or electro-mechanical devices, such as the wireless capable device 302, that will be apparent to those skilled in the relevant art(s) without departing from the spirit and scope of the present disclosure. Those skilled in the relevant art(s) will recognize that embodiments of the disclosure described herein may be implemented in hardware, firmware, software, or any combination thereof without departing from the present disclosure. Further, those skilled in the relevant art(s) will recognize that firmware, software, routines, instructions, or the like may be described herein as performing certain actions. However, it should be appreciated that such descriptions are merely for convenience and that such actions in fact result from one or more electrical, mechanical, and/or electro-mechanical devices executing the firmware, software, routines, instructions, or the like. Alternatively, or in addition to, those skilled in the relevant art(s) will recognize that embodiments of the disclosure described herein may also be implemented as instructions stored on a machine-readable medium, which may be read and executed by one or more processors without departing from the present disclosure. A machine-readable medium may include any mechanism for storing in a form readable by a machine, such as a computing device to provide an example. For example, a machine-readable medium may include read only memory (ROM), random access memory (RAM), magnetic disk storage media, optical storage media, flash memory devices, and the like.

After the wireless access point 202 has been placed within the customer premises 200, the wireless capable device 302 can execute the wireless network installation tool to interact with the wireless access point 202 to configure the wireless access point 202 for wireless communication. In these embodiments, the wireless network installation tool can configure one or more parameters, characteristics, and/or attributes of the wireless access point 202, such as customer credentials, for example, username and/or password, that are associated with the customer, frequency bands of operation for the wireless access point 202, and/or service set identifiers (SSIDs) and/or passwords for the wireless access point 202 to provide some examples.

Figure 3B:
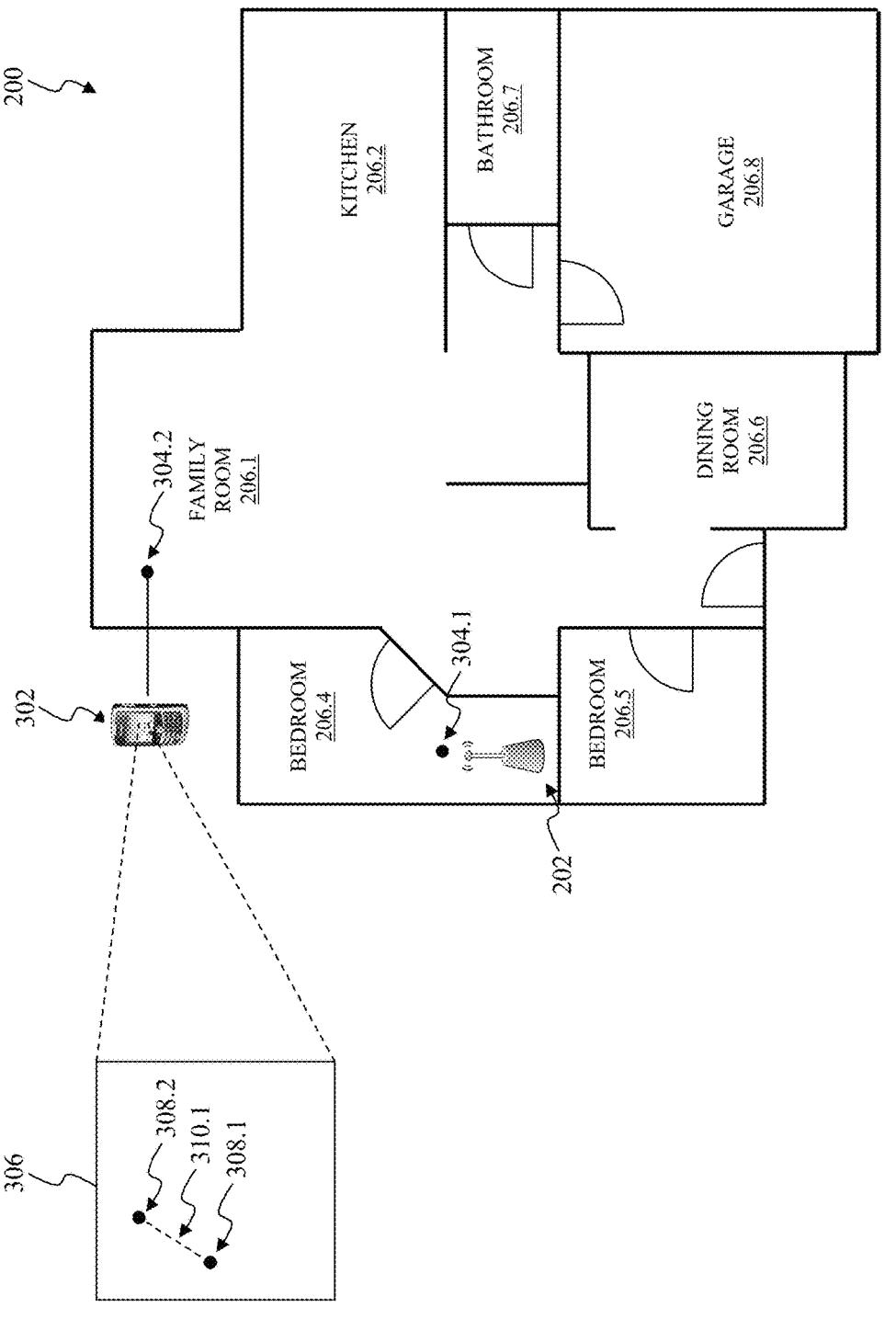
Figure 3C:
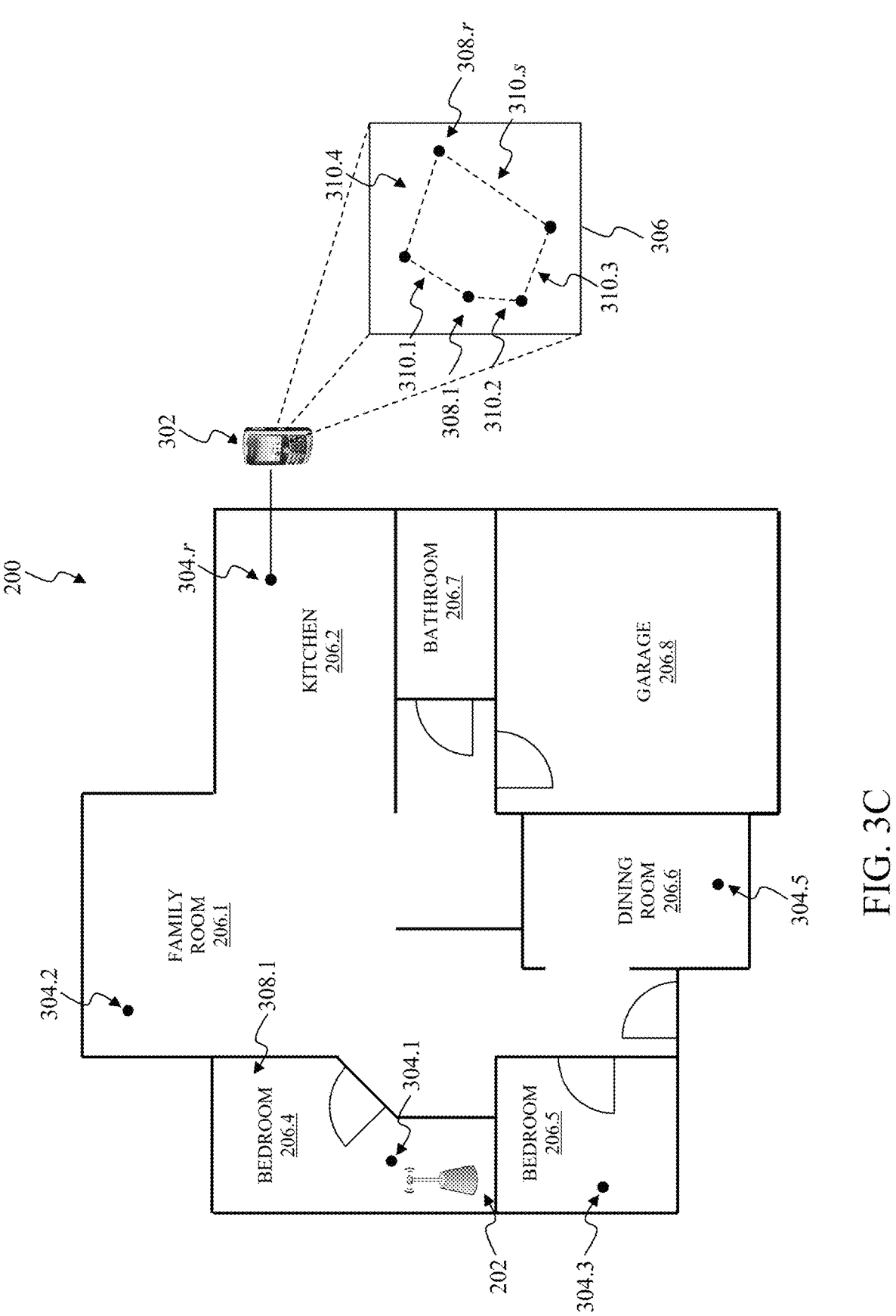

Once wireless access point 202 has been activated, the wireless network installation tool can thereafter estimate the communication range, or the reach, of the wireless access point 202 within the customer premises 200. As illustrated in FIG. 3A through FIG. 3C, the wireless network installation tool can measure one or more signal metrics that are associated with the wireless access point 202 at multiple locations 304.1 through 304.r within the customer premises 200. In some embodiments, the customer can operate the wireless capable device 302, for example, activate a push button switch on the wireless capable device 302, when the wireless capable device 302 is at the multiple locations 304.1 through 304.r to cause the wireless network installation tool to manually measure the one or more signal metrics at the multiple locations 304.1 through 304.r. Alternatively, or in addition to, the wireless network installation tool can automatically measure the one or more signal metrics at the multiple locations 304.1 through 304.r for example, once a second, multiple times per second, once a minute, multiple times per minute, and/or the like. For example, the wireless network installation tool can manually and/or automatically measure one or more signal metrics at a first location 304.1 from among the multiple locations 304.1 through 304.r within the customer premises 200 as illustrated in FIG. 3A, one or more signal metrics at a second location 304.2 from among the multiple locations 304.1 through 304.r within the customer premises 200 as illustrated in FIG. 3B, and/or one or more signal metrics at locations 304.3 through 304.r from among the multiple locations 304.1 through 304.r within the customer premises 200 as illustrated in FIG. 3C. Those skilled in the relevant art(s) will recognize that that the configuration and arrangement of the multiple locations 304.1 through 304.r as illustrated in FIG. 3A through FIG. 3F are for illustrative purposes only and not limiting. Rather, those skilled in the relevant art(s) will recognize that the teachings herein are equally applicable to other locations within the customer premises 200 without departing from the spirit and scope of the present disclosure.

In some embodiments, the one or more signal metrics can include one or more relative signal strengths, for example, received signal strength indicators (RSSI), one or more absolute signal strengths, for example, in decibel-milliwatts (dBms), throughput, for example, bits per second (bit/s or bps), bit error rates (BERs), and/or other suitable measures of the wireless electronic communications being transmitted by the wireless access point 202 that will be apparent to those skilled in the relevant art(s) without departing from the spirit and scope of the present disclosure. In some embodiments, the wireless network installation tool can store the multiple locations 304.1 through 304.r and the one or more signal metrics as an organized collection of data, often referred to as a database, that can be indexed by, for example, the multiple locations 304.1 through 304.r. The database may include one or more data tables having various data values, such as alphanumeric strings, integers, decimals, floating points, dates, times, binary values, Boolean values, and/or enumerations to provide some examples. The database can be a columnar database, a relational database, a key-store database, a graph database, and/or a document store to provide some examples. In some embodiments, the database can additionally include the make, model, type or brand of the wireless access point 202; one or more identifiers for the network that is associated with the wireless access point 202, such as a network identifier (ID) or a network name to provide some examples; a location of the wireless access point 202 within the customer premises 200; one or more device identifiers of the wireless access point 202, such as a serial number, a Media Access Controller (MAC) address, and/or an Internet Protocol (IP) address to provide some examples; and/or one or more statuses of the wireless access point 202, for example, power status information, channel tuning information, device re-boot information, and/or software version installed on the wireless access point 202. In some embodiments, the database can further identify provisioning information of the wireless access point 202, such as a name of the customer, an address of the customer premise 200, an electronic mail address of the customer, a telephone number associated with the customer, and/or a payment history of the customer.

Moreover, as illustrated in FIG. 3A through FIG. 3F, the wireless network installation tool can develop a performance map 306 that is related the performance of the wireless access point 202 within the customer premises 200 to graphically illustrate the communication range, or the reach, of the wireless access point 202 within the customer premises 200. In some embodiments, the performance map 306 can provide a real-time, or near-time, graphical collection of data showing the spatial distribution of the one or more signal metrics throughout the customer premises 200. In some embodiments, the wireless network installation tool can display the performance map 306 to provide the real-time, or the near-time, graphical collection of data showing the spatial distribution of the one or more signal metrics throughout the customer premises 200. As illustrated in FIG. 3A through FIG. 3C, the wireless network installation tool can plot multiple anchor points 308.1 through 308.*r* that correspond to the multiple locations 304.1 through 304.*r* onto the performance map 306. Those skilled in the relevant art(s) will recognize that that the configuration and arrangement of the multiple anchor points 308.1 through 308.*r* as illustrated in FIG. 3A through FIG. 3F are for illustrative purposes only and not limiting. Rather, those skilled in the relevant art(s) will recognize that the teachings herein are equally applicable to other configurations and arrangements of the multiple anchor points 308.1 through 308.*r* without departing from the spirit and scope of the present disclosure. In some embodiments, the wireless network installation tool can logically couple the multiple anchor points 308.1 through 308.*r* to one another using multiple logical pathways 310.1 through 310.*s* as illustrated in FIG. 3A through FIG. 3C. As described above, the wireless network installation tool can measure the one or more signal metrics at the multiple locations 304.1 through 304.*r*. In some embodiments, the wireless network installation tool can plot the multiple anchor points 308.1 through 308.*r* that correspond to the multiple locations 304.1 through 304.*r* onto the performance map 306. Alternatively, or in addition to, the wireless network installation tool can access a two-dimensional or a three-dimensional representation of a floorplan of the customer premises 200. In some embodiments, the wireless network installation tool can overlay the two-dimensional or the three-dimensional representation of the floorplan of the customer premises 200 onto the performance map 306. In these embodiments, the wireless network installation tool can plot the multiple anchor points 308.1 through 308.*r* that correspond to the multiple locations 304.1 through 304.*r* onto the floorplan of the customer premises 200.

In some embodiments, the wireless network installation tool can display the performance map 306 on the wireless capable device 302 to illustrate the spatial distribution of the one or more signal metrics throughout the customer premises 200 in real-time, or near real-time. In these embodiments, the wireless network installation tool can display the performance map 306 on the wireless capable device 302 virtually in two-dimensions or virtually in three-dimensions. In some embodiments, the wireless network installation tool can utilize an extended reality environment, such as an augmented reality (AR) environment, a mixed reality (MR) environment, and/or a virtual reality (VR) environment to provide some examples, to display the multiple anchor points 308.1 through 308.*r* and/or the multiple logical pathways 310.1 through 310.*s* virtually in two-dimensions and/or three-dimensions using the wireless capable device 302. In some embodiments, the wireless network installation tool can render the performance map 306 in two-dimensions and/or three-dimensions onto one or more images of the customer premises 200 that are being, or have been, captured by the wireless capable device 302. For example, the wireless network installation tool can identify one or more positions and/or one or more orientations of the wireless capable device 302 with respect to the performance map 306. In this example, the wireless network installation tool can render a corresponding portion of the performance map 306 that corresponds to the one or more positions and/or the one or more orientations of the wireless capable device 302. In this example, the wireless network installation tool can overlay the corresponding portion of the performance map

306 in three-dimensions on the one or more images of the customer premises 200 that are being, or have been, captured by the wireless capable device 302.

Figure 3D:
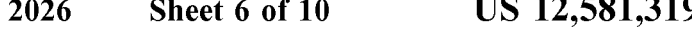

As described above, the performance map 306 can provide the real-time, or the near-time, graphical collection of data showing the spatial distribution of the one or more signal metrics throughout the customer premises 200 to graphically illustrate the communication range, or the reach, of the wireless access point 202 within the customer premises 200. In some embodiments, the wireless network installation tool can plot the one or more signal metrics at the multiple locations 304.1 through 304.*r* on the performance map 306 as illustrated in FIG. 3D to illustrate the spatial distribution of the one or more signal metrics throughout the customer premises 200 in real-time, or near real-time, on the performance map 306. In the exemplary embodiment illustrated in FIG. 3D, the wireless network installation tool can plot the one or more signal metrics at the multiple locations 304.1 through 304.*r* as a concentric circles diagram for the wireless access point 202 on the performance map 306. As illustrated in FIG. 3D, the concentric circles diagram for the wireless access point 202 can illustrate the spatial distribution of the one or more signal metrics in multiple overlapping circular designs. For example, as discussed above the one or more signal metrics can be one or more absolute signal strengths, for example, in decibel-milliwatts (dBms), at the multiple locations 304.1 through 304.*r*. In this example, the wireless network installation tool can plot those signal metrics having absolute signal strengths that are greater −30 dBm as being within a first concentric circle having the smallest radius, those signal metrics having absolute signal strengths between −30 dBm and −67 dBm as being within a second concentric circle, those signal metrics having absolute signal strengths between −67 dBm and −70 dBm as being within a third concentric circle, those signal metrics having absolute signal strengths between −70 dBm and −80 dBm as being within a fourth concentric circle, and/or those signal metrics having absolute signal strengths that are less than −80 dBm as being within a fifth concentric circle having the largest radius. In this example, the absolute signal strength of −67 dBm represents the minimum signal strength for applications, such as Voice over Internet Protocol (VoIP), Voice over Wi-Fi (VoWiFi), and/or streaming video to provide some examples, that provides very reliable, timely packet delivery, and/or the absolute signal strength of −70 dBm represents the minimum signal strength that provides reliable packet delivery for applications, such as electronic mail (email) and/or web surfing to provide some examples. However, those skilled in the relevant art(s) will recognize that other concentric circles diagrams for the wireless access point 202 are possible without departing from the spirit and scope of the present disclosure.

In some embodiments, the wireless network installation tool can label the concentric circles from among the concentric circles diagram for the wireless access point 202 in accordance with the one or more signal metrics at the multiple locations 304.1 through 304.*r*. As an example, wireless network installation tool can label those signal metrics within the first concentric circle as being excellent, those signal metrics within the second concentric circle as being good, those signal metrics within the third concentric circle as being average, those signal metrics within the fourth concentric circle as being poor, and/or those signal metrics within the fifth concentric circle as being unusable. Further in this example, those signal metrics that are labeled as being excellent are at a maximum achievable signal strength, those signal metrics that are labeled as being good are at least at the minimum signal metric for applications, such as Voice over Internet Protocol (VoIP), Voice over Wi-Fi (VoWiFi), and/or streaming video to provide some examples, that provides very reliable, timely packet delivery, those signal metrics that are labeled as being average are at least at the minimum signal metric that provides reliable packet delivery for applications, such as electronic mail (email) and/or web surfing to provide some examples, those signal metrics that are labeled as being poor are at least at a minimum signal metric for basic connectivity with unreliable packet delivery, and/or those signal metrics that are labeled as being unusable are at a level where any functionality is highly unlikely, namely, outside of the maximum communication range, or the maximum reach, of the wireless access point 202. In some embodiments, the wireless network installation tool can plot the multiple categories of signal metrics, for example, excellent, good, average, poor, and/or unusable, on the performance map 306 as illustrated in FIG. 3D to illustrate the spatial distribution of the one or more signal metrics throughout the customer premises 200 in real-time, or near real-time, on the performance map 306. In these embodiments, the wireless network installation tool can color code the concentric circles of the concentric circles diagram for the wireless access point 202 on performance map 306 with warm colors, such as red, orange, and/or yellow, designating areas of higher signal metrics and cool colors, such as blue, indigo, and/or violet, designating areas of lower signal metrics.

Figure 3E:
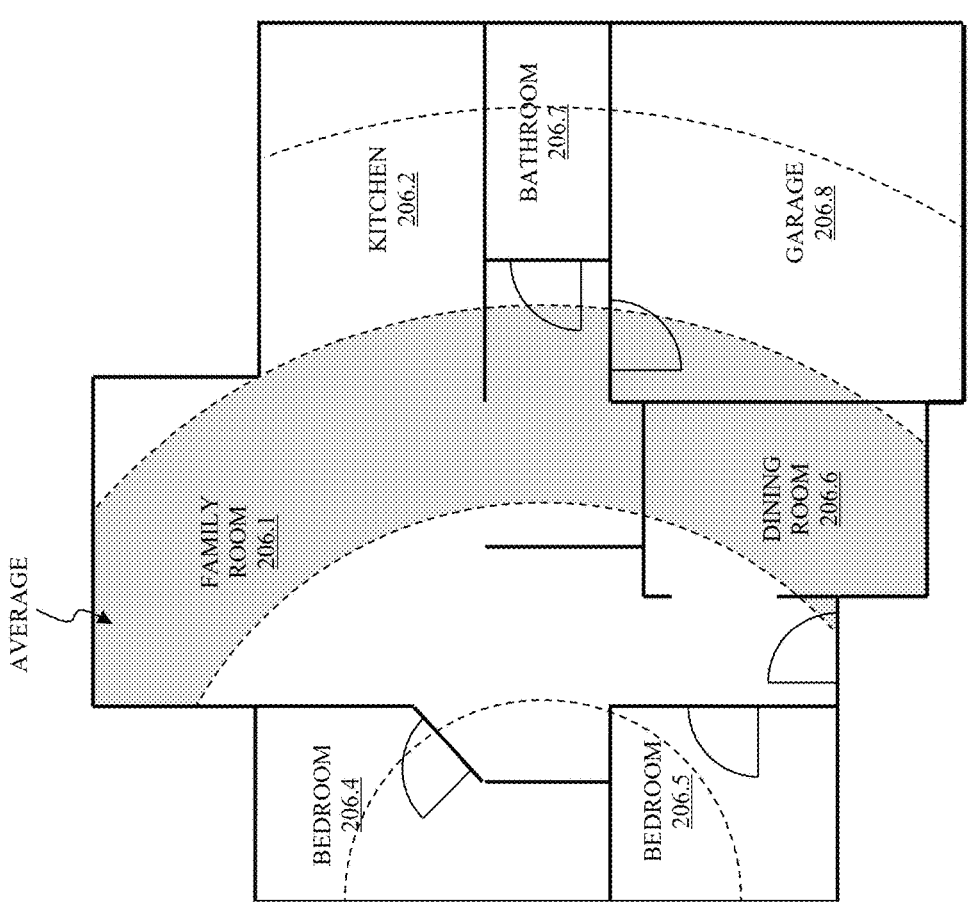

After estimating communication range, or the reach, of the wireless access point 202 within the customer premises 200, the wireless network installation tool can identify one or more locations within the customer premises 200 to place the wireless range extender 204 within the customer premises 200. In some embodiments, the one or more locations within the customer premises 200 can be situated at or near a maximum communication range, or a maximum reach, of the wireless access point 202 that provides reliable packet delivery, for example, within the third concentric circle labeled average in FIG. 3E. In these embodiments, the maximum communication range, or the maximum reach, of the wireless access point 202 can be associated with a minimum signal metric for applications, such as Voice over Internet Protocol (VoIP), Voice over Wi-Fi (VoWiFi), and/or streaming video to provide some examples, that provides very reliable, timely packet delivery, and/or a minimum signal metric that provides reliable packet delivery for applications, such as electronic mail (email) and/or web surfing to provide some examples. As illustrated in FIG. 3E, the wireless network installation tool can identify the one or more locations within the customer premises 200 whose signal metrics are associated with signal metrics between the minimum signal metrics that provides the very reliable, timely packet delivery, and the minimum signal metrics that provides the reliable packet delivery in which to place the wireless range extender 204 within the customer premises 200. In some embodiments, the one or more locations have the one or more signal metrics within the third concentric circle labeled average which has been colored in a grey shading in FIG. 3E for convenience.

After identifying the one or more locations within the customer premises 200 to place the wireless range extender 204, the customer can place the wireless range extender 204 at a three-dimensional location $(x_2, y_2, z_2)$ within the one or more locations within the customer premises 200. In some embodiments, the wireless network installation tool can remove some these locations from consideration for placing, or positioning, the wireless range extender 204 within the customer premises 200. In these embodiments, the wireless capable device 302 can assign labels, for example, high, medium, and/or low to provide some examples, to the one or more rooms within the customer premises 200 to indicate the expected usage of these rooms. In some embodiments, the wireless capable device 302 can ignore those locations from among the one or more locations that are within rooms labeled, for example, low. In some embodiments, the three-dimensional location $(x_2, y_2, z_2)$ can be sufficiently close to an electrical receptacle to provide power to the wireless range extender 204.

After the wireless range extender 204 is placed at the three-dimensional location $(x_2, y_2, z_2)$, the wireless capable device 302 can subsequently configure the wireless range extender 204 for wireless communication. In these embodiments, the wireless capable device 302 can configure one or more parameters, characteristics, and/or attributes of the wireless range extender 204, such as customer credentials, for example, username and/or password, that are associated with the customer, frequency bands of operation for the wireless range extender 204, and/or service set identifiers (SSIDs) and/or passwords for the wireless range extender 204 to provide some examples. Alternatively, or in addition to, the wireless range extender 204 can pair with the wireless access point 202 to receive the one or more parameters, characteristics, and/or attributes from the service provider network.

Figure 3F:
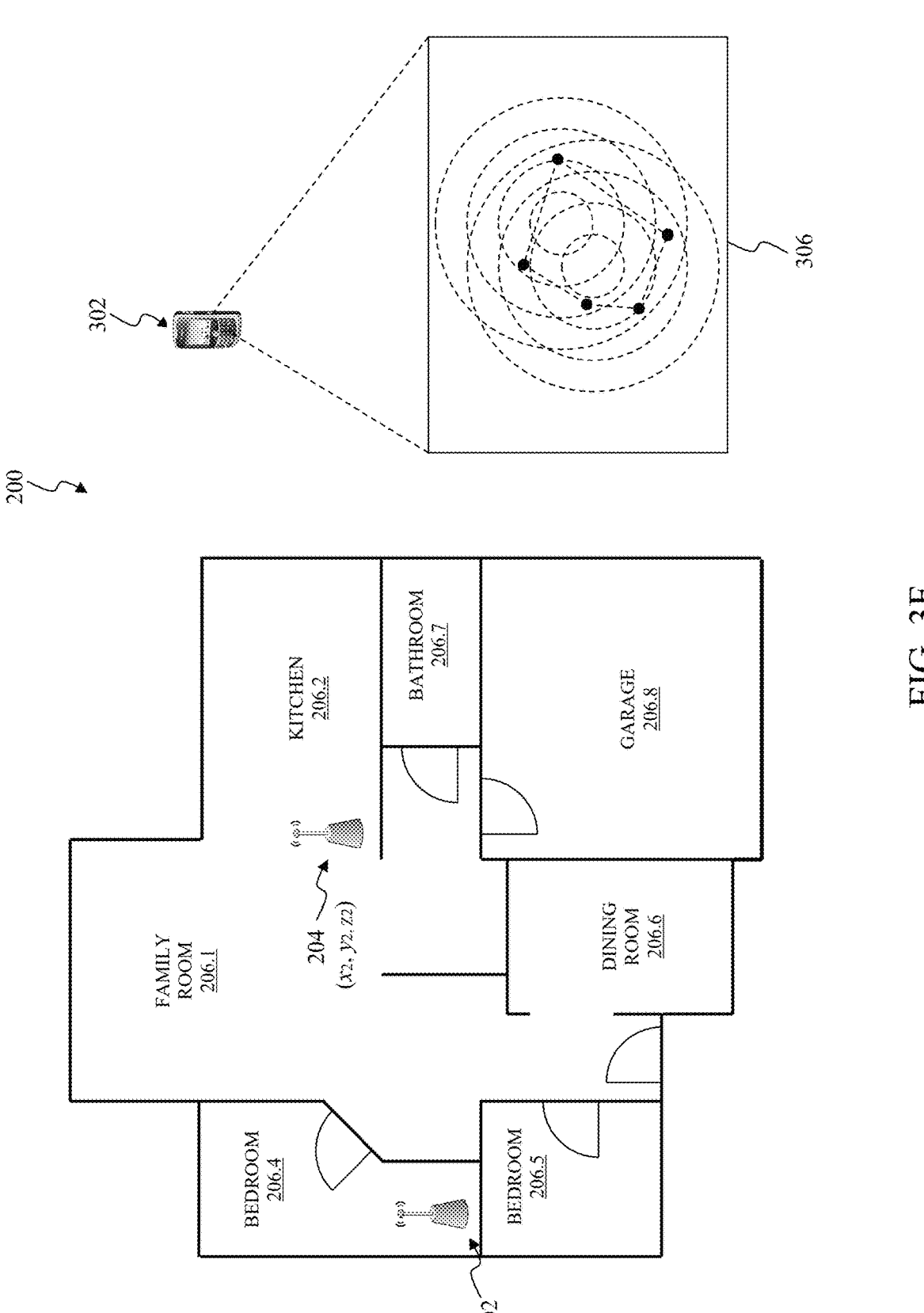

As illustrated in FIG. 3F, the wireless network installation tool can measure and plot one or more signal metrics of the wireless range extender 204 onto the performance map 306 in a substantially similar manner as the wireless access point 202 as described above. For ease of illustration, the one or more signal metrics of the wireless access point 202 and the one or more signal metrics of the wireless range extender 204 are not shaded in FIG. 3F. In some embodiments, the wireless network installation tool can provide the three-dimensional location $(x_1, y_1, z_1)$ and/or the three-dimensional location $(x_2, y_2, z_2)$ to a service provider system, such as the service provider system as described above, which can be advantageous in diagnosing and/or remedying errors, faults, and/or failures as described above. Although not illustrated in FIG. 3A through FIG. 3F, the wireless network installation tool can iteratively repeat the exemplary installation process as described above to place one or more other wireless range extenders within the customer premises 200 in a substantially similar manner as described above. For example, the wireless network installation tool can measure one or more signal metrics that are associated with the wireless range extender 204 at the multiple locations 304.1 through 304.r within the customer premises 200 in a substantially similar manner as described above. In this example, the wireless network installation tool can identify one or more other locations within the customer premises 200 to place one or more other wireless range extenders within the customer premises 200 in a substantially similar manner as described above.

Exemplary Interactive Game for Installing the Exemplary Wireless Network Equipment within the Exemplary Customer Premises FIG. 4 illustrates a flowchart of an exemplary operation for installing the exemplary wireless network equipment within the exemplary customer premises according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 400 for installing wireless network equipment, such as the wireless access point 110 and one or more of the one or more wireless range extenders 112.1 through 112.m, respectively, as described above in FIG. 1, within a customer premises, such as one of customer premises 104.1 through 104.n as described above in FIG. 1. As to be described in further detail below, the operational control flow 400 can renumerate various rewards for completing one or more of the operations as to be described in further detail below. In some embodiments, these rewards can include free and/or discounted services, such as, free or discounted media content, for example, a free or discounted online movie rental or purchase to provide an example. The operational control flow 400 can be executed by a wireless capable device, such as the wireless capable device 108 as described above in FIG. 1.

At operation 402, a customer associated with the customer premises places the wireless access point within the customer premises in a substantially similar manner as described above. In some embodiments, the operational control flow 400 can renumerate the reward to the customer for placing the wireless access point. In these embodiments, the customer can operate a wireless capable device, for example, the wireless capable device 108 as illustrated in FIG. 1 and/or the wireless capable device 302 as illustrated in FIG. 3A through FIG. 3F, to take a photograph of the wireless access point within the customer premises that can be identified by the operational control flow 400.

At operation 404, the operational control flow 400 estimates the communication range, or the reach, of the wireless access point within the customer premises in a substantially similar manner as described above. In some embodiments, the operational control flow 400 can renumerate the reward to the customer for each signal metric measured by the operational control flow 400 and/or each room of the customer premises identified by the customer in a substantially similar manner as described above.

At operation 406, the operational control flow 400 identifies a location to place, or position, the wireless range extender in a substantially similar manner as described above.

At operation 408, the customer places the wireless range extender within the customer premises at the location from operation 406 in a substantially similar manner as described above. In some embodiments, the operational control flow 400 can renumerate the reward to the customer for placing the wireless range extender. In these embodiments, the customer can operate the wireless capable device of operation 402 to take a photograph of the wireless range extender within the customer premises at the location from operation 406 that can be identified by the operational control flow 400.

Exemplary Wireless Capable Device that can be Implemented within the Exemplary Service Provider Network FIG. 5 illustrates a block diagram of an exemplary wireless capable device that can be implemented within the exemplary service provider network in accordance with various embodiments of the present disclosure. In the exemplary embodiment illustrated in FIG. 5, a wireless capable device may be any of the electronic devices, for example, the wireless capable device 108 as illustrated in FIG. 1 and/or the wireless capable device 302 as illustrated in FIG. 3A through FIG. 3F. As illustrated in FIG. 5, the electronic device includes one or more processors 510, one or more transceivers 550, a communication infrastructure 540, a memory 550, an operating system 552, an application 554, and an antenna 550. The various systems illustrated in FIG. 5 are provided as exemplary parts of the wireless capable device, and the wireless capable device can include other circuit(s) and subsystem(s). Also, although the systems of the wireless capable device are illustrated as separate components, the aspects of this disclosure can include any combination of these, less, or more components. Also, the wireless capable device can include any number of processors, transceivers, communication infrastructures, memories, operating systems, applications, and antennas.

The memory 550 may include random access memory (RAM) and/or cache, and may include control logic (e.g., computer software) and/or data. The memory 550 may include other storage devices or memory such as, but not limited to, a hard disk drive and/or a removable storage device/unit. According to some examples, the operating system 552 can be stored in the memory 550. The operating system 552 can manage transfer of data between the memory 550, the application 554, the processor 510, and/or the transceiver 550. In some examples, the operating system 552 maintains one or more network protocol stacks (e.g., Internet protocol stack, cellular protocol stack, and the like) that can include a number of logical layers. At corresponding layers of the protocol stack, the operating system 552 includes control mechanism and data structures to perform the functions associated with that layer. In some embodiments, the application 554 can be stored in the memory 550. The application 554 can include applications (e.g., user applications) used by a wireless electronic device and/or a user of the wireless electronic device. The application 554 can include applications such as, but not limited to, radio streaming, video streaming, remote control, and/or other user applications.

The wireless capable device can also include the communication infrastructure 540. The communication infrastructure 540 provides communication between, for example, the processor 510, the transceiver 550, and the memory 550. In some implementations, the communication infrastructure 540 may be a bus. The processor 510 together with instructions stored in memory 550 can performs operations enabling the wireless capable device 500 to install wireless network equipment within a customer premises as described above in FIG. 1, FIG. 2, FIG. 3A through FIG. 3F, and/or FIG. 4.

The transceiver 550 can transmit and receive communications signals that support the operations of electronic device including, but not limited to, mitigation for transmitting latency, according to some aspects, and may be coupled to the antenna 550. The antenna 550 may include one or more antennas that may be the same or different types. The transceiver 550 allows the wireless capable device to communicate with other devices that may be wired and/or wireless. In some examples, the transceiver 550 can include processors, controllers, radios, sockets, plugs, buffers, and like circuits/devices used for connecting to and communicating on networks. According to some examples, the transceiver 550 include one or more circuits to connect to and communicate on wired and/or wireless networks. In some embodiments, the transceiver 550 can include a cellular subsystem, a WLAN subsystem, and/or a Bluetooth™ subsystem, each including its own radio transceiver and protocol(s) as will be understood by those skilled arts based on the discussion provided herein. In some implementations, the transceiver 550 can include more or fewer systems for communicating with other devices. In some embodiments, the transceiver 550 can include one or more circuits (including a WLAN transceiver) to enable connection(s) and communication over WLAN networks such as, but not limited to, networks based on standards described in IEEE 802.11. Additionally, or alternatively, the transceiver 550 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 550*n* can include a Bluetooth™ transceiver. In some embodiments, the transceiver 550 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, the transceiver 550*a*-550*n* can be configured to operate according to one or more of Rel-15, Rel-15, Rel-17, or other of the 3GPP standards.

In some embodiments, the processor 510, alone or in combination with computer instructions stored within the memory 550, and/or the transceiver 550 can install wireless network equipment within the customer premises as described above in FIG. 1, FIG. 2, FIG. 3A through FIG. 3F, and/or FIG. 4.

CONCLUSION

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A wireless capable device for identifying a location for a wireless range extender within a customer premises, the wireless capable device comprising:

a memory configured to store a wireless network installation tool; and a processor configured to execute the wireless network installation tool, the wireless network installation tool, when executed by the processor, configuring the processor to:

measure a plurality of signal metrics of a wireless access point at a plurality of locations within the customer premises to estimate a communication range of the wireless access point;

develop a performance map of the customer premises that graphically illustrates a spatial distribution of the plurality of signal metrics throughout the customer premises;

identify the location for the wireless range extender within the customer premises at a maximum communication range of the wireless access point that provides reliable packet delivery in which to place the wireless range extender; and ignore one or more locations within one or more rooms of the customer premises as being the location for the wireless range extender within the customer premises based on an expected usage of the one or more rooms.

2. The wireless capable device of claim 1, wherein the plurality of signal metrics comprises a plurality of signal strengths of the wireless access point at the plurality of locations.

3. The wireless capable device of claim 1, wherein the wireless network installation tool, when executed by the processor, configures the processor to plot a plurality of anchor points that correspond to the plurality of locations onto the performance map.

4. The wireless capable device of claim 3, wherein the wireless network installation tool, when executed by the processor, configures the processor to plot the plurality of anchor points as a concentric circles diagram on the performance map, the concentric circles diagram including a plurality of a plurality of overlapping circular designs, each overlapping circular design from among the plurality of overlapping circular designs corresponding to a range of signal metrics from among a plurality of ranges of the plurality of signal metrics.

5. The wireless capable device of claim 1, wherein the maximum communication range of the wireless access point is associated with a minimum signal metric that provides at least the reliable packet delivery.

6. The wireless capable device of claim 5, wherein the minimum signal metric comprises an absolute signal strength of at least −67 dBm or at least −70 dBm.

7. A method for identifying a location for a wireless range extender within a customer premises, the method comprising:
measuring, by a wireless capable device, a plurality of signal metrics of a wireless access point at a plurality of locations within the customer premises to estimate a communication range of the wireless access point;
developing, by a wireless capable device, a performance map of the customer premises that graphically illustrates a spatial distribution of the plurality of signal metrics throughout the customer premises;
identifying, by a wireless capable device, the location for the wireless range extender within the customer premises at a maximum communication range of the wireless access point that provides reliable packet delivery in which to place the wireless range extender; and
ignoring one or more locations within one or more rooms of the customer premises as being the location for the wireless range extender within the customer premises based on an expected usage of the one or more rooms.

8. The method of claim 7, wherein the plurality of signal metrics comprises a plurality of signal strengths of the wireless access point at the plurality of locations.

9. The method of claim 7, wherein the developing comprises plotting a plurality of anchor points that correspond to the plurality of locations onto the performance map.

10. The method of claim 9, wherein the plotting comprises plotting the plurality of anchor points as a concentric circles diagram on the performance map, the concentric circles diagram including a plurality of a plurality of overlapping circular designs, each overlapping circular design from among the plurality of overlapping circular designs corresponding to a range of signal metrics from among a plurality of ranges of the plurality of signal metrics.

11. The method of claim 7, wherein the maximum communication range of the wireless access point is associated with a minimum signal metric that provides at least the reliable packet delivery.

12. The method of claim 11, wherein the minimum signal metric comprises an absolute signal strength of at least −67 dBm or at least −70 dBm.

13. A wireless capable device for identifying a location for a wireless range extender within a customer premises, the wireless capable device comprising:
a memory configured to store a wireless network installation tool; and
a processor configured to execute the wireless network installation tool, the wireless network installation tool, when executed by the processor, configuring the processor to:
measure a plurality of signal strengths of a wireless access point within a plurality of rooms of the customer premises to estimate a communication range of the wireless access point;
identify the location for the wireless range extender within the customer premises at a maximum communication range of the wireless access point that is situated within a room from among the plurality of rooms in which to place the wireless range extender; and
ignore one or more locations within one or more rooms of the customer premises as being the location for the wireless range extender within the customer premises based on an expected usage of the one or more rooms.

14. The wireless capable device of claim 13, wherein the wireless network installation tool, when executed by the processor, configures the processor to develop a performance map of the customer premises that graphically illustrates a spatial distribution of the plurality of signal strengths throughout the customer premises.

15. The wireless capable device of claim 14, wherein the wireless network installation tool, when executed by the processor, configures the processor to plot a plurality of anchor points that correspond to the plurality of rooms onto the performance map as a concentric circles diagram on the performance map, the concentric circles diagram including a plurality of a plurality of overlapping circular designs, each overlapping circular design from among the plurality of overlapping circular designs corresponding to a range of signal strengths from among a plurality of ranges of the plurality of signal strengths.

16. The wireless capable device of claim 13, wherein the maximum communication range of the wireless access point is associated with a minimum signal strength that provides at least reliable packet delivery.

17. The wireless capable device of claim 16, wherein the minimum signal strength comprises an absolute signal strength of at least −67 dBm or at least −70 dBm.

* * * * *